Figure 1:
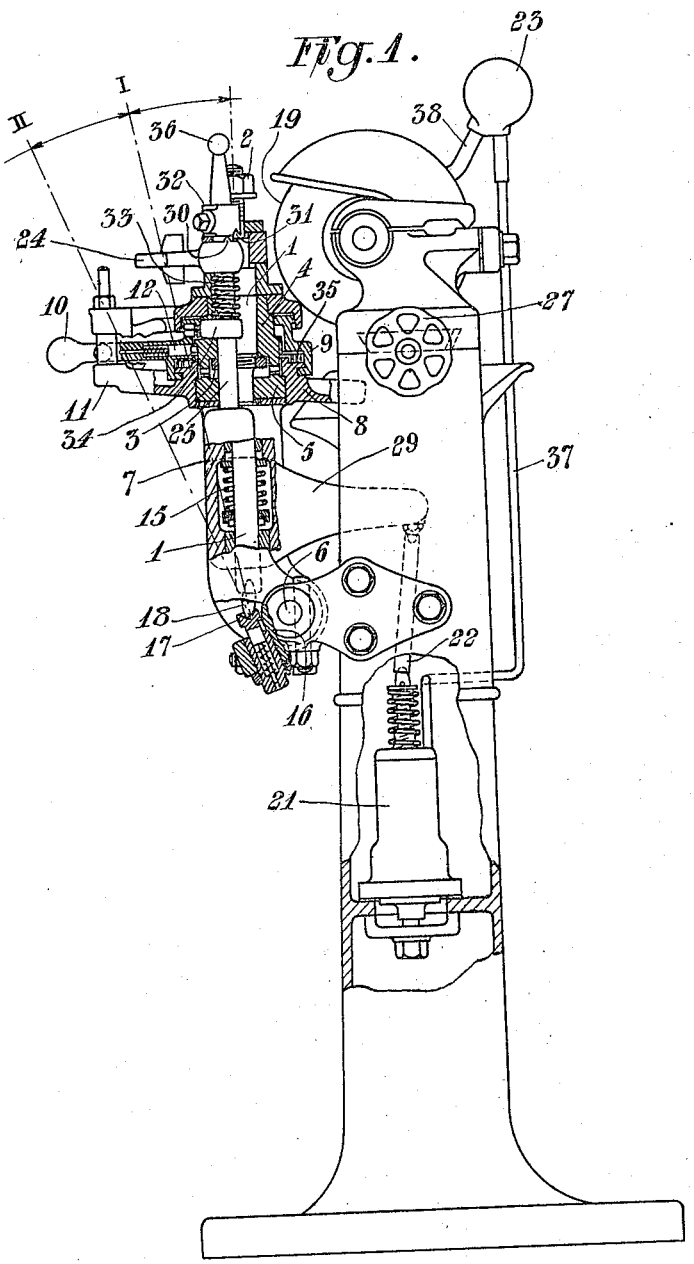

J. O. LIFFLANDER.
GRINDING MACHINE FOR CUTTERS AND SIMILAR TOOLS.
APPLICATION FILED JULY 26, 1915.

1,179,331.

Patented Apr. 11, 1916.
2 SHEETS—SHEET 2.

Inventor:
John Oscar Lifflander
By Burton & Fulk
Attorneys

UNITED STATES PATENT OFFICE.

JOHAN OSCAR LIFFLANDER, OF STOCKHOLM, SWEDEN, ASSIGNOR TO J. & C. G. BOLINDERS MEKANISKA VERKSTADS AKTIEBOLAG, OF STOCKHOLM, SWEDEN.

GRINDING-MACHINE FOR CUTTERS AND SIMILAR TOOLS.

1,179,331.         Specification of Letters Patent.        Patented Apr. 11, 1916.

Application filed July 26, 1915. Serial No. 42,101.

*To all whom it may concern:*

Be it known that I, JOHAN OSCAR LIFFLANDER, a subject of the King of Sweden, residing at Stockholm, in the Kingdom of Sweden, have invented a new and useful Improvement in Grinding-Machines for Cutters and Similar Tools, of which the following is a specification.

When grinding cutters and similar tools it is important that the grinding is made with such precision that the pitch, that is, the distance between the points of the teeth, becomes equal all around the cutter. Even the slightest error will cause one or more teeth to become either longer or shorter in radial direction than the other. In the former case these teeth will be the only teeth of the cutter which cut to the desired depth, and in the latter case they can not take part in the cutting operation. In other words, it is necessary that the pitch of the ground cutter is exactly equal for utilizing the cutting power of all the teeth effectively.

Another equally important condition is that the cutting angle of each tooth, that is, the angle between the radius through the point of the tooth and the front face of the tooth is not changed, as this angle is accurately defined for a good cutting operation.

With the means hitherto used, it has, indeed, been possible to effect the grinding in a satisfactory manner, but as a certain skill and workmanship has been a necessary condition, it is evident that occasional defects have been unavoidable.

The grinding machines actually used consist principally of an adjustable table on which the cutter is placed on a stud projecting from the table. The stops on the table for limiting the step-by-step rotation of the cutter as the teeth are ground one after another, are so arranged that they engage the teeth directly or, rather, enter into the spaces between the teeth. A defect in the very shape of a tooth, or in the shape of one of the said spaces, may thus cause a corresponding variation in the step-by-step rotation of the cutter. Again, in machines constructed in such manner that the rotation of the cutter is limited by means of a disk on the spindle supporting the cutter, which disk is provided with slots or the like engaged by a plunger, a ratchet or the like, the mostly used slots will become worn more than the other, which will cause the pitch to become inexact.

The present invention refers to a grinding machine by means of which the grinding may be effected in such manner that the pitch remains exactly equal all around the cutter and so that the cutting angle of the teeth will remain the same.

The invention is broadly characterized in that for supporting and securing the cutter the machine is provided with a rotatable spindle movable in axial direction, between which spindle and another spindle, a disk or the like in the machine a clutch or jaw coupling or other similar coupling is so arranged that when the first named spindle is moved axially, the coupling becomes disengaged so that the spindle and the cutter secured to the same may be rotated, the rotation being controlled by a stop-device coacting with the spindle and adjustable according to the pitch of the cutter.

The device for securing always the same cutting angle of the cutter is broadly characterized by an arm, a pawl or the like pivoted at one side of the movable spindle, which arm or the like by means of a notch or other stop on the same may be brought to engage the point of one of the teeth of the cutter, so that before the beginning of the grinding operation the cutter is fixed in a position corresponding to the proper cutting angle, and it is further characterized in that the part of the machine supporting the grinding means, preferably a grinding wheel, is adjustable in such manner that when the cutter has been fixed in the manner above described, the grinding surface may be accurately adjusted along the surface of the tooth to be ground.

The accompanying drawings illustrate, by way of example, a machine embodying the present invention.

Figure 2:
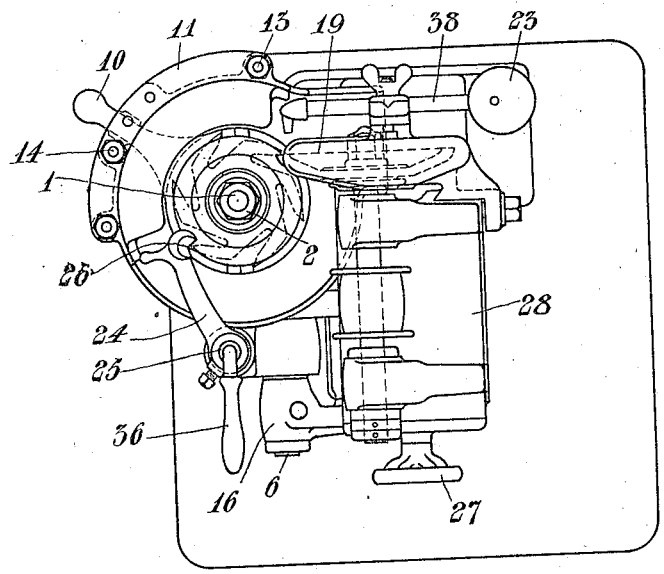

Figure 1 shows the machine from the side and partly in section, and Fig. 2 shows a plan view of the machine.

1 denotes the rotatable spindle around the upper part of which the cutter is secured during the grinding operation by means of the nut 2 on the upper threaded end of the spindle. Secured to the spindle by means of a nut 3 is a coupling member 4 coöperating with the coupling member 5 which is secured to a non-rotatable part 7 of the machine, which part is pivoted on the pin 6. An annular part 9 turns on a flange 8 secured to said part 7. The part 9 is provided with a handle 10 movable along a curved rail 11. The part 9 is connected by means of a ratchet device 12 with the coupling member 4 in such manner that this member, and thus also the spindle and the cutter secured to the same, is brought along when the handle is moved in one direction (counter-clockwise in Fig. 2 of the drawings), but is not brought along when the handle is moved in the opposite direction. When one tooth has been ground, and the cutter is to be rotated for the grinding of the next tooth, the handle 10 is moved from the fixed stop 13 to an adjustable stop which in this case (a cutter with 6 teeth) is located at 14. While this movement is performed for the first time after the beginning of the grinding operation, the back edge of the cutter moves the pawl 24 out from the cutter, until the tooth 30 reaches the notch 31 in the collar 32 on the stud 25 supporting the pawl, when the spring 33 mounted between the pawl 24 and another collar 34 on the stud will press the tooth into the notch so that the pawl is swung farther out. When the said movement has been performed (the movement from 13 to 14) the handle is released and it is then automatically returned to the starting position, that is, to the stop 13, by means of a spring 35 secured between the part 9 and the flange 8. During this latter automatic movement of the handle 10 the cutter remains stationary.

In order to make it possible to turn the spindle 1 the coupling 4, 5 must be disengaged. For this purpose the following arrangement is provided. The spindle 1 is movable in axial direction in the part 7, which is pivoted by means of the pin 6 to the machine frame 16. A spring-actuated support 17 is movable in the frame 16, and the upper cup-like end of this support 17 serves to receive one end of a link 18 the other end of which enters a recess in the lower end of the spindle 1. The spindle 1, the link 18, and the support 17 are so placed in relation to each other that when the part 7 is swung out to the position indicated by the line II in Fig. 1, the link 18 resting against the support 17 will move the spindle upward so that the coupling members 4 and 5 become disengaged and the spindle with the cutter becomes free to be turned. The disengagement or the upward movement of the spindle will not take place, however, during the first stage of the swinging out of the part 7, that is, it does not take place while the part 7 is swung from the position shown to the position indicated by the line I in Fig. 1, as during this period the spring-actuated support 17 is pressed into the frame. During the movement between the positions I and II, when the support 17 cannot be further pressed in, the spindle 1 will be moved upward so that the coupling 4, 5 becomes disengaged. The spring 15 inserted between a shoulder on the part 7 and a collar on the spindle 1, is then compressed.

The object of the above-described arrangement is to make it impossible to rotate the spindle before the cutter has been swung entirely out of engagement with the grinding wheel 19, or else the cutter may become damaged by hitting the grinding wheel when rotated. When the part 7 has been swung out to the position II, the cutter may be rotated in the manner previously described by means of the handle 10. The cutter having been turned, so that the next tooth is in place the part 7 is swung back so that the cutter engages the grinding wheel. The compressed spring 15 aided by the weight of the parts attached to the coupling member 4 will then move this member into engagement with the member 5.

The grinding is performed by swinging the part 7 forward and backward by means of the handle 36 on the same, but the part 7 must not be swung farther out than to the position I.

In order to prevent the edges of the teeth becoming heated during the grinding a suitable cooling liquid is thrown on the teeth. This liquid is drawn up by means of a special pumping device consisting of a pump 21 secured in the machine frame. The plunger rod of the pump is actuated by a connecting rod 22 inserted between the plunger rod and a lug 29 on the part 7. The pump is connected by means of a pipe 37 with a receptacle 23, which is open at the top. Another pipe 38 conveys the cooling liquid to the tooth of the cutter and the adjacent surface of the grinding wheel. By this device the cooling liquid will only be supplied to the cutter when the machine is in use, that is, when the part 7 is swung forward and backward and the pump thus operated. The receptacle will insure an even flow of the liquid to the cutter during the operation.

The device for effecting a quick initial adjustment of a cutter in such position that the desired cutting angle is obtained during the grinding, consists of the pawl 24 pivoted in the manner above described on the stud 25 secured to the part 7. At its free end the pawl 24 is provided with a notch 26. When a cutter is placed over the upper end of the spindle 1, the pawl is swung against the cutter, which is then turned until one of its teeth engages the notch 26. The cutter is now secured by means of the nut 2 on the upper threaded portion of the spindle. The cutter is now fixed in the position corresponding to the desired cutting angle. By means of the hand-wheel 27 the support 28 for the grinding wheel 19 is moved so that the grinding wheel comes in the right position for grinding the front face of the teeth. This adjustment having been effected the grinding may begin. When one tooth has been ground the cutter is rotated in the manner above described, the coupling 4, 5 insuring that each subsequent tooth arrives in exactly the same position as the first tooth ground.

If, as in the machine shown in the drawings, the stud 25 is not adjustable and the support 28 can not be turned, the adjustment by means of the described device of the cutting angle is not quite correct for cutters of all diameters. In the case of cutters of ordinary diameters, however, the error is so small that it is of no practical consequence.

I claim:—

1. In a grinding machine for cutters and similar tools, the combination of a part connected to the machine frame, a rotatable spindle for supporting the cutter movable in axial direction in the said part, a jaw coupling one member of which is secured to the spindle and the other to the said part, and a stopping device coacting with the spindle for controlling the rotation of the same, substantially as and for the purpose set forth.

2. In a grinding machine for cutters and similar tools, the combination of a part connected to the machine frame, a rotatable spindle for supporting the cutter movable in axial direction in the said part, a jaw coupling one member of which is secured to the spindle and the other to the said part, a movable handle, a ratchet between the handle and the spindle, and means for limiting the movement of the handle, substantially as and for the purpose set forth.

3. In a grinding machine for cutters and similar tools, the combination of a part connected to the machine frame, a rotatable spindle for supporting the cutter movable in axial direction in the said part, a jaw coupling one member of which is secured to the spindle and the other to the said part, a movable handle, a ratchet between the handle and the spindle, a rail secured to the said part along the path of travel of the handle, a fixed stop on the rail for limiting the movement of the handle in one direction, and an adjustable stop on the rail for limiting the movement of the handle in the other direction, substantially as and for the purpose set forth.

4. In a grinding machine for cutters and similar tools, the combination of a part pivotally connected to the machine frame, a rotatable spindle for supporting the cutter movable in axial direction in the said part, a jaw coupling one member of which is secured to the spindle and the other to the said part, a support in the machine frame, and a link between the spindle and the support, said support being so located that when the said part is swung out from the machine the spindle resting against the link is moved relatively to the said part for disengaging the coupling, substantially as and for the purpose set forth.

5. In a grinding machine for cutters and similar tools, the combination of a part pivotally connected to the machine frame, a rotatable spindle for supporting the cutter movable in axial direction in the said part, a jaw coupling one member of which is secured to the spindle and the other to the said part, a spring-actuated support movable in the machine frame and provided with a stop, and a link between the spindle and the support, said support being so located that when the said part is swung out from the machine the support is pressed into the machine frame until it rests on the stop, when the spindle resting against the link is moved relatively to the said part for disengaging the coupling, substantially as and for the purpose set forth.

6. In a grinding machine for cutters and similar tools, the combination of a part pivotally connected to the machine frame, a rotatable spindle for supporting the cutter movable in axial direction in the said part, a jaw coupling one member of which is secured to the spindle and the other to the said part, a stud on said part, an arm pivoted on said stud, and a stop on said arm for engaging a tooth on a cutter placed on the spindle, substantially as and for the purpose set forth.

7. The combination with a grinding machine for cutters and similar tools, having a part pivotally connected to the machine frame and supporting the cutter, of a pump in the machine frame connected with the said part so as to be operated when the said part is moved, and a pipe from said pump to the grinding place in the machine, substantially as and for the purpose set forth.

8. The combination with a grinding machine for cutters and similar tools, having a part pivotally connected to the machine frame and supporting the cutter, of a pump in the machine frame connected to the said part so as to be operated when the said part is moved, a pipe from said pump to the grinding place in the machine, and a collecting receptacle in said pipe, substantially as and for the purpose set forth.

JOHAN OSCAR LIFFLANDER.

Copies of this patent may be obtained for five cents each, by addressing the "Commissioner of Patents, Washington, D. C."